United States Patent
Sugaya et al.

Patent Number: 5,440,093
Date of Patent: Aug. 8, 1995

[54] STRUCTURE OF CONSTRAINED CHIP FOR PLASMA JET TORCH, AND PLASMA JET WORKING METHOD USING THIS CONSTRAINED CHIP

[75] Inventors: Toshikatu Sugaya, Mito; Mitsuo Hara, Ibaragi; Yutaka Kikuchi; Kenichi Tanimoto, both of Mito; Tokujirou Sagisaka, Hitachioota; Shuuichi Oomori, Katsuta, all of Japan

[73] Assignee: Doryokuro Kakunenryo Kaihatsu Jigyodani, Tokyo, Japan

[21] Appl. No.: 274,007

[22] Filed: Jul. 12, 1994

[30] Foreign Application Priority Data

Jul. 14, 1993 [JP] Japan .................. 5-196805

[51] Int. Cl.$^6$ .................. B23K 10/00
[52] U.S. Cl. .................. 219/121.5; 219/121.49; 219/121.39; 219/119; 219/121.48
[58] Field of Search .......... 219/121.5, 121.49, 121.39, 219/121.36, 119, 118, 81; 313/231.21, 231.31, 231.41

[56] References Cited

U.S. PATENT DOCUMENTS

| | | | |
|---|---|---|---|
| 4,424,432 | 1/1984 | Kaneko et al. | 219/69 E |
| 4,594,496 | 6/1986 | Bebber et al. | 219/121.5 |
| 5,079,403 | 1/1992 | Sturges et al. | 219/121.5 |
| 5,214,263 | 5/1993 | Sakuragi | 219/121.5 |
| 5,239,162 | 8/1993 | Haun et al. | 219/121.52 |
| 5,334,814 | 8/1994 | Nosetani et al. | 219/119 |
| 5,347,099 | 9/1994 | Gissinger et al. | 219/81 |

FOREIGN PATENT DOCUMENTS

| | | |
|---|---|---|
| 570746 | 9/1958 | Belgium . |
| 0003702 | 8/1979 | European Pat. Off. . |
| WO90/04484 | 3/1990 | WIPO . |

*Primary Examiner*—Mark H. Paschall
*Attorney, Agent, or Firm*—Dickstein, Shapiro & Morin

[57] ABSTRACT

A constrained chip for a plasma Jet torch is here disclosed, and the constrained chip is made of a metal, is forcedly cooled, and functions as one discharge electrode. A plasma generated by gas discharge is Jetted through a nozzle of the constrained chip for the plasma jet torch. This constrained chip 30 is all completely made of a Cu and Zr alloy, and a nozzle portion 32 has a nozzle bore diameter of 3.0 mm to 3.5 mm and a nozzle constraint ratio b/a (b is a length of the nozzle constrained portion) of 2.5 to 3.

4 Claims, 3 Drawing Sheets

| NOZZLE DIAMETER a | NOZZLE LENGTH b | CONSTRAINT RATIO b/a | ABRASION WEAR/TIME (mg) (min) | SHAPE OF JET |
|---|---|---|---|---|
| 3 | 3 | 1 | 1635/24 | |
| | 6 | 2 | 142/30 | |
| | 7.5 | 2.5 | 0/30 | |
| | 15 | 5 | 1/30 | |

STRUCTURE OF CONSTRAINED CHIP FOR PLASMA JET TORCH, AND PLASMA JET WORKING METHOD USING THIS CONSTRAINED CHIP

BACKGROUND OF THE INVENTION (i) Field of the Invention

The present invention relates to a plasma jet torch equipped with a constrained chip through whose nozzle a plasma generated by gas discharge is jetted, and the constrained chip is made of a metal, is forcedly cooled and functions as one discharge electrode. More specifically, it relates to a material and a shape of the constrained chip mounted on a tip of plasma jet torch.

(ii) Description of the Prior Art

Plasma cutting techniques can be classified into a plasma arc cutting method by which a metal can be cut, and a plasma jet cutting method by which a metal and a nonmetal can be cut. As shown in FIG. 1, the plasma jet cutting method uses an apparatus in which a plasma jet power source 14 and a high-frequency generator 16 are connected between a tungsten electrode 10 and a water-cooked constrained chip 12 made of oxygen-free copper. The cutting operation of the plasma jet cutting method will be carried out as follows: In the first place, a working gas (e.g., an argon gas) is caused to flow between the tungsten electrode 10 and the constrained chip 12, and the high-frequency generator 16 is then operated to discharge a high-frequency arc, thereby destroying the electric insulation of the working gas and forming an ionized electric passage. An arc current continuously flows from the plasma jet power source 14 through the working gas, and at this time, a plasma flow 20 is generated by arc heat. This heat of the plasma flow 20 is utilized to cut an article 22 to be cut.

According to this method, the plasma flow 20 is jetted through the nozzle of the constrained chip 12 by the thermal expansion of the plasma gas itself. Thus, the arc current does not flow through the article 22 to be cut, in contrast to the plasma arc cutting method. For this reason, the plasma jet cutting method also permits the cutting of non-conductive materials (e.g., fire bricks and concretes). However, an energy density of the generated high-temperature plasma flow rapidly declines, as the plasma flow jetted through the nozzle leaves the nozzle, and therefore the thermal efficiency of the plasma jet cutting method is as low as 10 to 20%. In consequence, this cutting method cannot be considered to be an efficient cutting technique. Accordingly, the plasma jet cutting method has not usually been put to practical use, and as a commercially available product, only a 30A grade torch for cutting acrylic plates has been present.

However, articles to be cut are not always made of conductive materials. For example, in a decommissioning operation of nuclear fuel facilities, the plasma jet cutting method is considered to be promising, because it is capable of cutting various materials which form the constitutional equipments of the facilities such as concrete and plastics in addition to metals. Thus, an experimental plasma Jet cutting torch was made for the purpose of verifying the principle of this method. The torch for the principle verification comprised a commercially available plasma arc torch additionally provided with an outer nozzle serving as an anode, in which the plasma flow could be generated between a tungsten electrode and the outer nozzle. It was confirmed that a metal (a material: SUS-304) having a thickness of 25 mm and a refractory brick (an electrocast brick) having a thickness of 150 mm could be pierced and crushed with the stable plasma flow obtained by this cutting torch (the plasma Jet cutting torch was held on an article to be cut for a certain time to achieve the piercing) (in the case that compressive strength was about 2,000 kg/cm2, they were crushed by thermal shock), and so the plasma Jet cutting torch was practical as a cutting device for the decommissioning.

However, the experimental torch for the principle verification was large (length=about 500) and heavy (weight=about 4 kg), and so it was difficult to handle the torch together with a remote manipulation device such as an MS (a master slave), a manipulator or a robot. Thus, taking the remote manipulation into consideration, a practical torch for generating the plasma flow between a tungsten electrode and a water-cooling constrained copper chip was made so that the shape and weight of the torch might have the same shape and weight as in a plasma arc cutting torch (length=about 240 mm and weight=about 1 kg) which was utilized together with the MS manipulator or the like. A bore diameter and a constrained nozzle portion of the constrained chip were set to 3 mm and 3 mm, respectively.

However, in this miniaturized practical torch, the constrained chip which was an anode was noticeably molten, so that any stable plasma flow could not be obtained and the cutting was impossible. Hence, it was apparent that the experimental cutting torch was impractical as the cutting device for the decommissioning of nuclear fuel facilities.

SUMMARY OF THE INVENTION

An object of the present invention is to realize a plasma Jet torch which is small and light, can generate a stable plasma flow, can sufficiently inhibit a constrained chip (a chip for constraining a plasma jet) from melting, can improve durability, and can possess a sufficient working ability such as the cutting of articles to be cut.

In order to achieve the above-mentioned object, a constrained chip for the plasma Jet torch of the present invention has the following characteristics.

That is to say, the present invention is directed to a plasma jet torch having a constrained chip which is made of a metal, is forcedly cooled, and functions as one discharge electrode. A plasma generated by gas discharge between torch discharge electrodes is jetted through the nozzle of the constrained chip for the plasma Jet torch.

The constrained chip for the plasma jet torch is made of an alloy containing Cu and Zr, a bore diameter of the nozzle is in the range of 3.0 mm to 3.5 mm, and a nozzle constraint ratio, which is a ratio of a length of the nozzle to the bore diameter of the nozzle, is in the range of 2.5 to 3.

Furthermore, the above-mentioned alloy contains 99.5 wt % or more of copper and 0.1 to 0.2 wt % of zirconium.

A working gas is caused to flow through the constrained chip, and discharge is carried out between the constrained chip which is one electrode and another electrode positioned at the center of the constrained chip to generate a plasma flow, and an article to be cut is then cut by the heat of the plasma flow. When the constrained chip is made of a Cu—Zr alloy and it has a bore diameter of 3.0 to 3.5 mm and a nozzle constraint ratio of 2.5 to 3, the stable plasma flow can be maintained, even if the plasma jet torch is miniaturized. In addition, an abrasion wear of the chip can be inhibited, and a cutting ability can be improved.

In order to inhibit the constrained chip from melting, it is effective to use the constrained chip made of a Cu—Zr alloy which is a heat-resistant copper alloy for conduction instead of the Cu chip which has generally been used in the plasma cutting method. In this case, the durability can be improved by about 6.5 times. In order to stabilize the generated plasma flow and to reduce the melting of the chip, it is effective to lengthen the constrained portion of the nozzle. Furthermore, for the sake of improvement of the cutting performance, a nozzle bore diameter of about 3.0 mm is optimum, and a suitable nozzle constraint ratio depends upon this nozzle bore diameter.

DESCRIPTION OF THE PREFERRED EMBODIMENT

Figure 1:
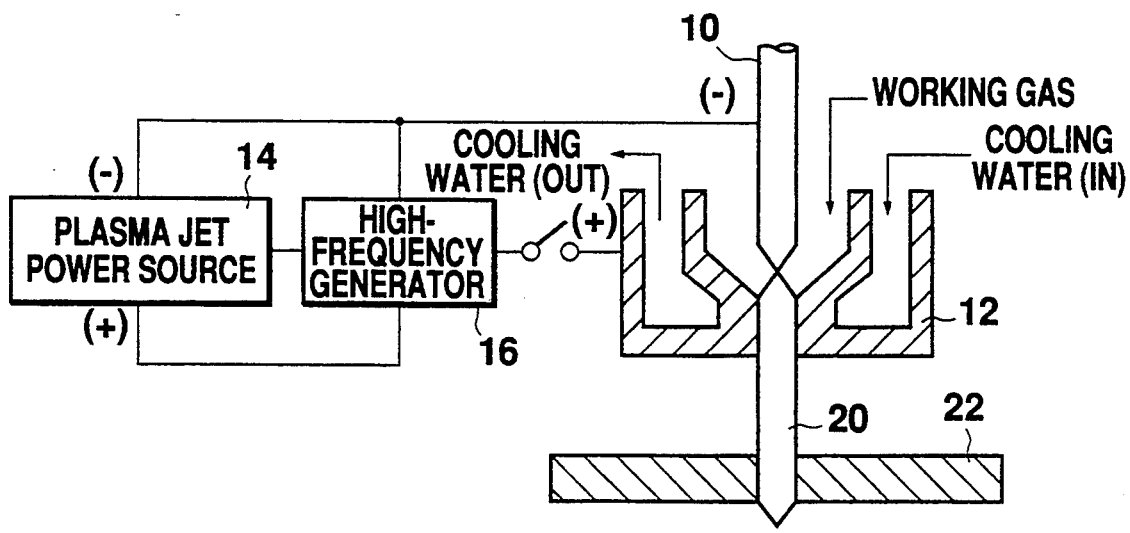
FIG. 1 is an illustrative view of the principle of a plasma jet cutting method.
Figure 2:
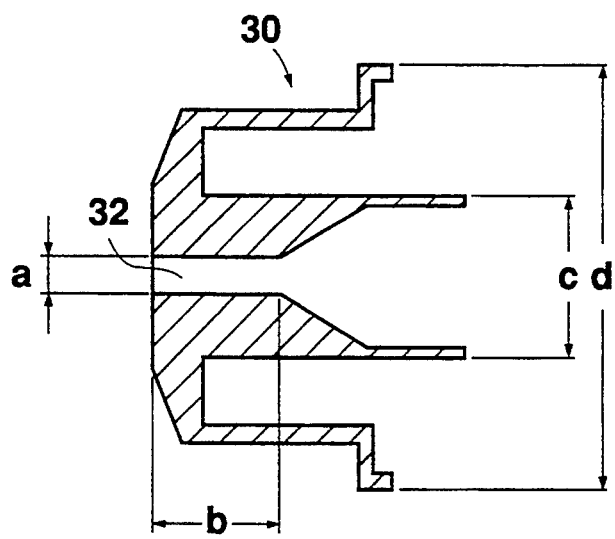
FIG. 2 is a sectional view showing one embodiment of a constrained chip according to the present invention.

FIG. 2 is a sectional view showing one embodiment of a constrained chip for a plasma jet torch regarding the present invention. This constrained chip 30 is completely formed from a Cu—Zr alloy, and a bore diameter a of its nozzle portion 32 is set in the range of 3.0 to 3.5 mm and a nozzle constraint ratio b/a (b is a length of the constrained nozzle portion) is set in the range of 2.5 to 3. The reason why the material and the size of the plasma jet torch are restricted as specified above will be described hereinafter. In this connection, the optimum sizes of the constrained chip shown in FIG. 2 which were obtained by experiments were a=3 mm, b=7.5–9 mm, c=11 mm, and d=28 mm.

The material for the constrained chip used in the plasma jet torch is required to have excellent electric conductivity and thermal conductivity, and thus such a material is usually pure copper (Cu≧99.99). Now, conventional type chips having the same shape (a nozzle bore diameter=3 mm, and a constrained nozzle portion length=3 mm) were made of Cu, a Cu—Zr alloy (Cu≧99.50 and Zr=0.10–0.20), a Cu—Be alloy and Inconel 600, and a plasma was then jetted by the use of these chips. As a result, the constrained chips made of the respective materials could not obtain the stable plasma flow. However, it was apparent that both of the electric conductivity and thermal conductivity of the Cu—Zr alloy chip were a little poorer than those of the Cu chip, but a plasma flow jetting time (a durability time) of the Cu—Zr alloy chip was equal to or more excellent than that of the Cu chip. The abrasion wear of the other Cu—Be alloy and Inconel 600 chips were much larger, as compared with the Cu chip and the like.

The reason why the abrasion wear of the chip having the above-mentioned conventional shape is very noticeable is that a wall effect obtained by the constrained nozzle portion of the chip (an effect of stabilizing the gas flow of the plasma flow generated by the constrained nozzle portion of the chip) and a thermal pinch effect obtained by cooling the chip (the plasma flow has characteristics that it shrinks by cooling from surroundings to have a high temperature) are insufficient, and the bundling properties and a cooling efficiency of the generated plasma deteriorate, so that the stable plasma flow cannot be obtained and the chip is molten by the heat of the plasma flow diffused at the extreme end of the chip. Thus, experimental chips having a nozzle bore diameter of 3 mm and a prolonged length of a constrained nozzle portion of 10 mm were made, and their effects were then investigated. Materials of the chips were two kinds of Cu and Cu—Zr alloy. As a result, the wall effect and the thermal pinch effect of both the chips could be improved to obtain the stable plasma flow.

Figure 3:
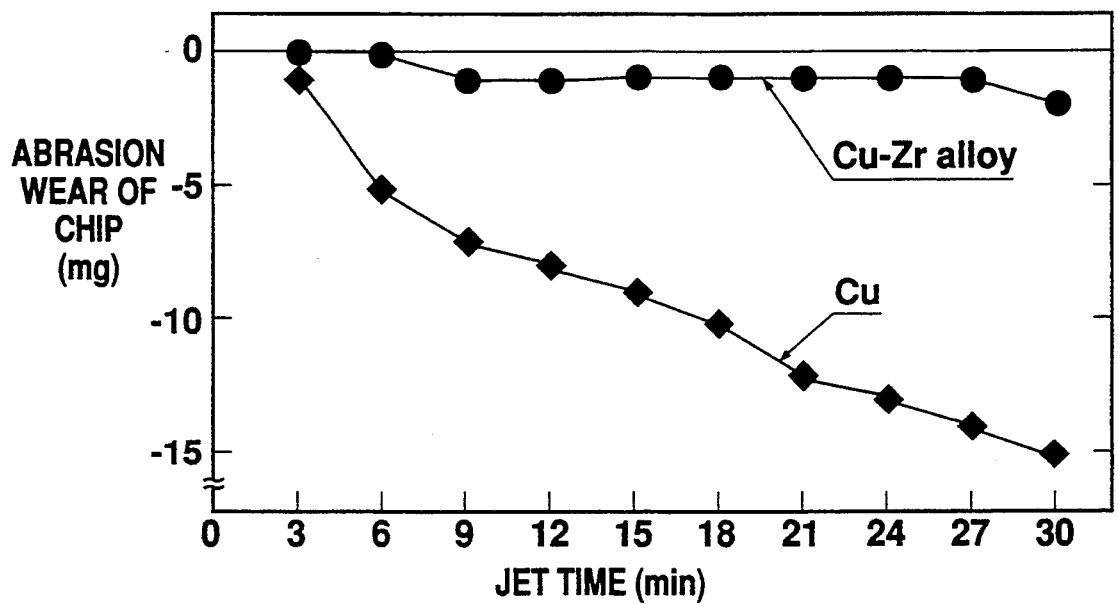
FIG. 3 is an illustrative view showing abrasion wear of the chip depending on the materials.

However, comparing the abrasion wear by jetting the plasma flow for 30 minutes, it was apparent as shown in FIG. 3 that the abrasion wear of the Cu chip in 30 minutes was about 15 mg, but that of the Cu—Zr alloy chip was merely about 2 mg, and a difference between these values was definitely large. In succession, the plasma flow was jetted for 5 hours. As a result, the abrasion wear of the Cu—Zr alloy chip was unchanged, and the stable plasma flow could be maintained.

Figure 4:
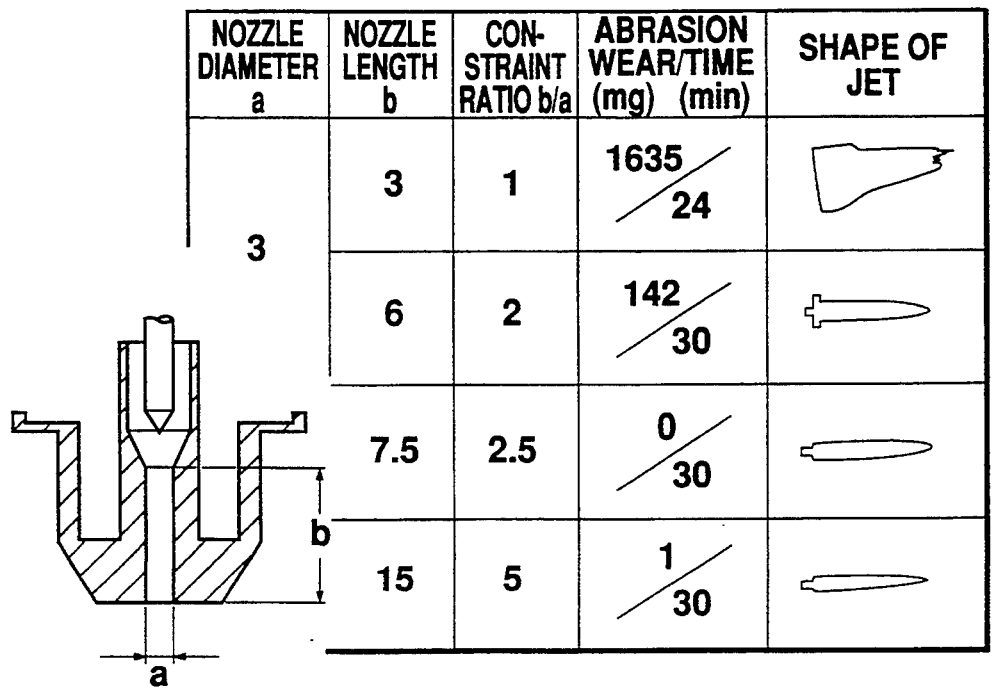
FIG. 4 is an illustrative view showing a relationship between the shape and the abrasion wear of the constrained chip as well as jet shapes.
Figure 5:
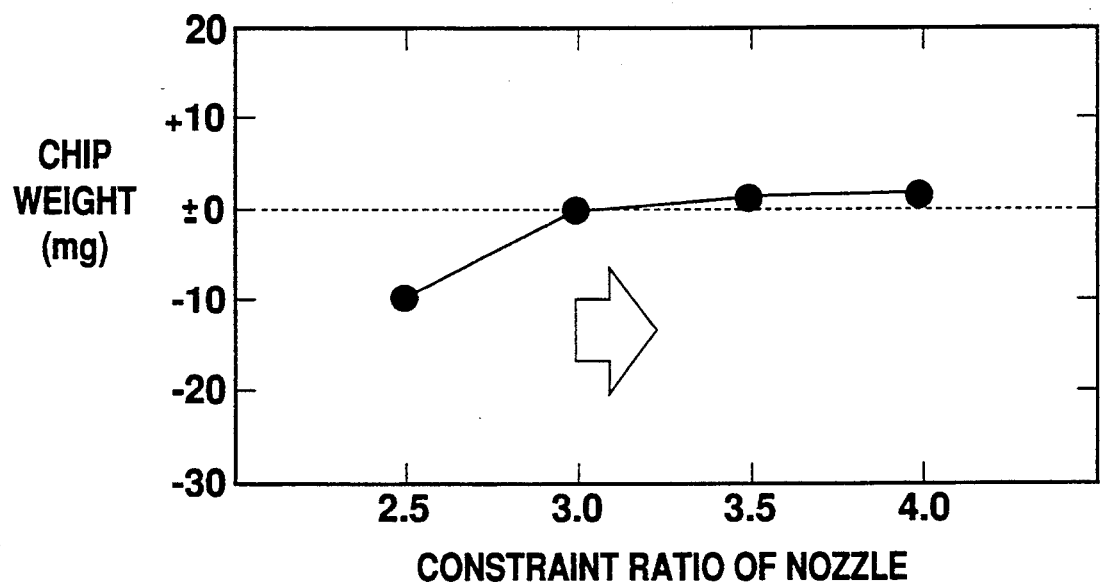
FIG. 5 is a graph showing a relationship between a nozzle constraint ratio and a chip weight.

The chip of the general plasma arc cutting torch has a nozzle constraint ratio of 2, but the optimum shape of the plasma jet cutting torch has not been apparent. Thus, for the purpose of determining the nozzle bore diameter and the nozzle constraint ratio which can inhibit the chip from melting by jetting the plasma flow for 30 minutes, investigations were carried out by utilizing the nozzle bore diameters of 2 to 5 mm and the nozzle constraint ratios of 2 to 5 as parameters. One example of the results is shown in FIG. 4. It was confirmed that in the case that the nozzle bore diameter was 3 mm, the stable plasma flow could be obtained and the chip was not molten at a nozzle constraint ratio of 2.5 or more. However, in the case that the nozzle bore diameter was 3.5 mm or more and the nozzle constraint ratio was less than 3, the weight of the chip was negative, assuming an initial chip weight to be ±0. That is to say, the weight was decreased by the melting. Consequently, in order to obtain the stable plasma flow, the nozzle constraint ratio is required to be 3 or more. Furthermore, when the nozzle bore diameter was 2 mm, the generated plasma flow stagnated in the chip, so that a tungsten electrode was worn by the jet of the plasma flow for several seconds.

Figure 6:
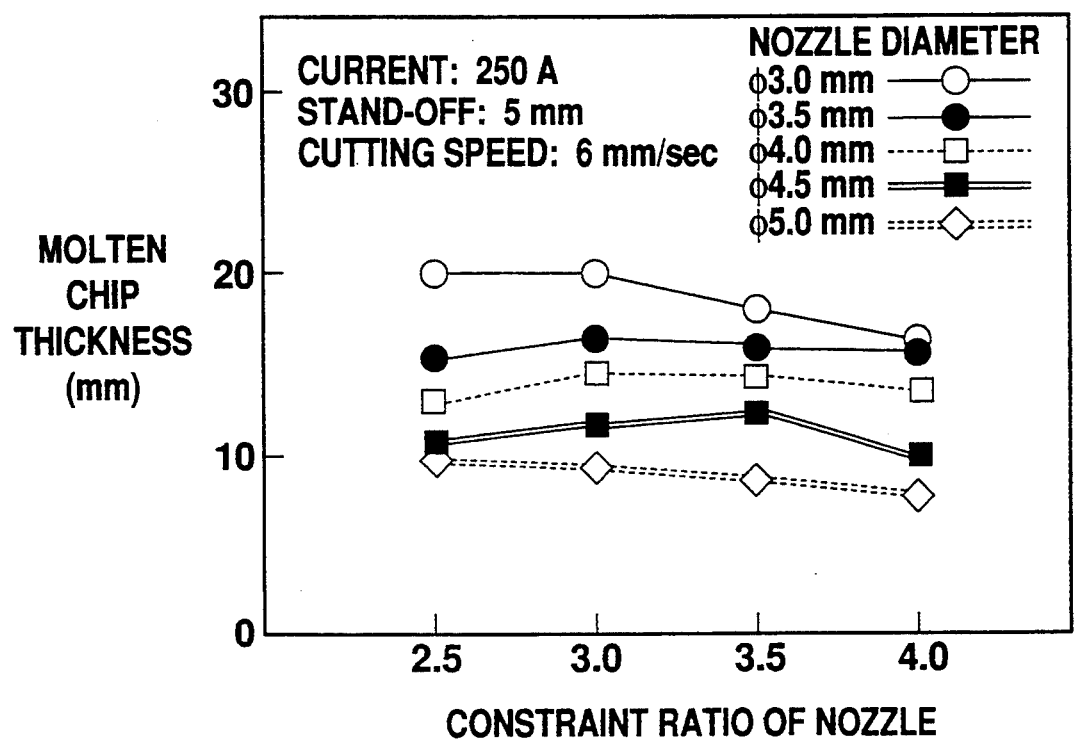
FIG. 6 is a graph showing a relationship between a nozzle constraint ratio and a molten chip thickness obtained by utilizing a nozzle bore diameter as a parameter.

Next, tapered stainless steel plates (material: SUS-304) were cut by the chips having nozzle bore diameters of 3 to 5 mm and nozzle constraint ratios of 2.5 to 4 to compare cutting performances. The results are shown in FIG. 6. As shown in the drawing, a tendency was observed in which the larger the nozzle bore diameter was, the lower the cutting performance was. In this case, cutting conditions were current=250 A (max), stand-off (a distance between the tip of the plasma torch and the article to be cut)=5 mm, cutting speed=6 mm/sec, and a used gas=Ar+N$_2$.

From these results, it was confirmed that the optimum chip which could inhibit the chip from wearing and which had the excellent cutting performance possessed a nozzle bore diameter of 3 mm and a nozzle constraint ratio of 2.5 to 3. Furthermore, this constrained chip could cut a stainless steel plate (SUS-304) having a thickness of 46.5 mm (a desired thickness was 20 mm), and it was confirmed that the chip had sufficient cutting ability. In this case, cutting conditions were current=250 A (max), stand-off=5 mm, cutting speed=1 mm/sec, and a used gas =Ar+$N_2$.

According to a constrained chip for a plasma jet cutting torch which is constituted as described above, a plasma flow can be stabilized, and the abrasion wear of the chip can be inhibited. In consequence, the chip can have an improved durability and a high cutting performance, and a reduction in size and weight can be achieved. As a result, for example, the constrained chip can be applied as a cutting device for the decommissioning of nuclear fuel facilities which can be operated by a manipulator. In addition, a plasma jet cutting method which has not been put to practical use can also be applied to the cutting and working of metals and non-metals. Moreover, with regard to the constrained chip of the present invention, the abrasion wear is small as described above, and so its risk at the time of maintenance is low, and a large decrease of cost can be expected.

What is claimed is:

1. A constrained chip which is forcedly cooled and which functions as one discharge electrode for a plasma jet torch, the constrained chip comprising:
   a nozzle through which a plasma generated by gas discharge between a discharge electrode of the plasma jet torch and the constrained chip is jetted, wherein said constrained chip is made of an alloy containing Cu and Zr, a bore diameter of the nozzle of the constrained chip is in the range of 3.0 mm to 3.5 mm, and the nozzle of the constrained chip has a constraint ratio, which is a ratio of a length of the nozzle to the bore diameter of the nozzle, in the range of 2.5 to 3.

2. The constrained chip according to claim 1, wherein the alloy contains 99.5 wt % or more of copper and 0.1 to 0.2 wt % of zirconium.

3. A plasma jet working method comprising the step of:
   jetting a plasma through a nozzle of a constrained chip of a plasma jet torch to work articles, wherein said constrained chip is made of an alloy of Cu and Zr, is forcedly cooled, and functions as one discharge electrode of the plasma jet torch, a bore diameter of the nozzle of the constrained chip is in the range of 3.0 mm to 3.5 mm, and the nozzle of the constrained chip has a constraint ratio, which is a ratio of a length of the nozzle to the bore diameter of the nozzle, the range of 2.5 to 3.

4. The plasma jet working method according to claim 3, wherein the alloy contains 99.5 wt % or more of copper and 0.1 to 0.2 wt % of zirconium.

* * * * *